United States Patent [19]

Whittaker

[11] Patent Number: 4,826,626
[45] Date of Patent: May 2, 1989

[54] RADIATION-SENSITIVE MATERIAL

[75] Inventor: Brian Whittaker, Grove, Wantage, England

[73] Assignee: United Kingdom Atomic Energy Authority, London, England

[21] Appl. No.: 928,051

[22] Filed: Nov. 7, 1986

[30] Foreign Application Priority Data

Nov. 14, 1985 [GB] United Kingdom ................. 8528106

[51] Int. Cl.⁴ ............................................... G01T 1/12
[52] U.S. Cl. ................................. 252/408.1; 523/136; 523/137; 524/473; 252/600
[58] Field of Search ............................ 252/600, 408.1; 523/136, 137; 524/473

[56] References Cited

U.S. PATENT DOCUMENTS 3,899,677  8/1975  Hori et al. ............................ 252/600
4,008,085  2/1975  Lemahieu et al. ................... 430/335

FOREIGN PATENT DOCUMENTS 1057878  3/1986  Japan .................................... 252/600
 920689  3/1963  United Kingdom .
1194931  5/1970  United Kingdom .
1210048  10/1970 United Kingdom .
1235970  6/1971  United Kingdom .

OTHER PUBLICATIONS

"Recent Developments in Poly(Methyl Methacrylate) Dye Systems for Dosimetry Purposes", Whittaker, Dr. B., Jul. 1970.
"Studies on Radiation Dosimetry by a Solid Color-Changing Substance", Wakabayashi, et al., J. Radiat. Res., vol. 4, Nos 2-3-4, pp. 68-79 (Jun., Sep., Dec. 1963).
IBM Technical Disclosure Bulletin, vol. 25, No. 10, Mar. 1983.
"Dosimetry Systems for Radiation Processing", Harwell brochure, Undated.

Primary Examiner—Herbert J. Lilling
Attorney, Agent, or Firm—Larson and Taylor

[57] ABSTRACT

Radiation-sensitive material for use in dosimetry comprises a matrix base, an acid-sensitive dye such as dimethyl yellow, and a halogen-containing substance, the material being capable of producing a halo-acid upon radiolysis. The matrix base is a solid polymer such as poly(methyl methacrylate) and the halogen-containing substance is a solid in which the polymer is insoluble such as hexachloroethane so that the radiation-sensitive material is a solid, self-supporting plastics material.

7 Claims, 3 Drawing Sheets

RADIATION-SENSITIVE MATERIAL

This invention relates to radiation-sensitive material for use in dosimetry and its preparation.

Radiation-sensitive dyed acrylic material for dosimetry in the radiation-processing industry is known. It may, for example, be in the form of optically-clear rectangular 'dosimeters' e.g. of dimensions 30 mm × 11 mm with a nominal thickness of 3 mm. Such material darkens when irradiated, which radiation-induced darkening, accurately measurable by means of a spectrophotometer, is a function of absorbed dose. The darkening may, for example, be due to the radiation-sensitivity of a dye in the material. The above is described by Dr B. Whittaker in "Recent developments in poly(methyl methacrylate)/dye systems for dosimetry purposes", a paper presented at a One Day Symposium convened by the UK Panel on Gamma and Electron Irradiation and held at the National Physical Laboratory, Teddington, Middlesex, UK on Monday, 6th July 1970 under the general title "Radiation Dose and Dose-Distribution Measurements in the Megarad Range".

Specific examples of dosimeters discussed in the above paper include Red Perspex*, such as Red 4034 Perspex, a dyed poly(methyl methacrylate) which exhibits a colour change from red to dark red to black upon irradiation, and Amber 3042 Perspex, a poly(methyl methacrylate) dyed with a combination of azo dyes.

(*Perspex is a Registered Trade Mark of ICI plc).

This invention is concerned with a plastics material for use in dosimetry in which a source of halo-acid and an acid-sensitive dye are provided. "Studies on Radiation Dosimetry by a Solid Color Changing Substance (Solid Color Radiation Dosimetry)" by Wakabayashi et al in J. Radiat. Res. Vol. 4, No. 2-3-4, 68–79, (June, Sept., Dec., 1963) describes a solid chemical dosimeter including a source of halo-acid and an acid-sensitive dye. However, Wakabayashi et al state that in tests on some plastics materials that were soluble in chloroform such as polystyrene and poly(methyl methacrylate), the materials turned gel-like when chloroform was added. For this reason, together with their stated difficulty in moulding and low radiation sensitivity, Wakabayashi et al conclude that such materials are disqualified as base materials for dosimeters.

Also, radiation-sensitive material consisting of a chlorine-containing polymer (e.g. derived from vinyl chloride) and an acid-sensitive dye is known. See, for example, UK Patent No. 1 194 931 which states that the polymer is dehydrochlorinated when the material is irradiated thereby reducing pH and causing the acid-sensitive dye to change colour. Such materials are not, however, reported to be sensitive and quantitative at relatively low radiation doses.

The invention provides a material that ameliorates the difficulties described by Wakabayashi et al and is sensitive at low radiation doses. Thus, in a first aspect, the invention provides a solid, self-supporting radiation-sensitive plastics material for use in dosimetry comprising, in homogeneous admixture, a matrix base of a solid polymer, an acid-sensitive dye and a solid halogen-containing substance in which the polymer is insoluble, the material being capable of producing a halo-acid upon radiolysis.

In use of the material as a dosimeter, irradiation causes a halo-acid to be produced which, in turn, causes the dye to change colour or colour intensity due to the consequent lowering of the pH of the material.

By "acid-sensitive dye" is meant a dye that changes measurably and detectably in colour or colour intensity on reaction with a halo-acid in the environment of the material of the invention so that the change can be calibrated to give a quantitative measure of absorbed radiation dose. Examples of such dyes are azo dyes such as dimethyl yellow and 4-(pyrrolidino)azobenzene.

The polymer must have optical properties appropriate for the change in the dye to be measured and detected and also have the capability, in conjunction with the halogen-containing substance, of being dehydrohalogenated upon radiolysis of the material. The polymer may therefore have to have an appropriate proportion of hydrogen atoms per molecule. A preferred example of such a polymer is poly(methyl methacrylate). Other examples of polymers for use in the invention are polystyrene and polycarbonate.

The halogen-containing substance is one capable of reacting with the polymer upon radiolysis of the material to produce a halo-acid. Examples are halogenated aliphatic hydrocarbons such as chloroalkanes, preferably hexachloroethane.

Dosimeters made from material of the invention may be more sensitive to radiation than known dosimeters as will be illustrated in the examples herein, and may be non-sensitive to light. For example, such dosimeters are an order of magnitude more sensitive than known, commercially available Amber 3042 dosimeters and can measure doses of as low as 100 gray (Gy) or less.

In a second aspect of the invention, the material of the invention may be made by the steps of (i) preparing a homogeneous mixture comprising the dye, the halogen-containing substance and either the polymer or a monomer polymerisable thereto; and (ii) polymerising the monomer, if present, and fabricating the mixture into a self-supporting material.

Preferably, the mixture in step (i) includes the monomer since the homogeneity of the mixture can then be improved and polymerisation and fabricating carried out at the same time by casting in a mould.

Where the mixture in step (i) includes the polymer, the fabrication in step (ii) may be carried out by hot-pressing to form sheets or by injection moulding to form discs or other shapes.

Several ways of carrying out the invention will now be described by way of example. Reference will be made to the accompanying drawings wherein

EXAMPLE 1

Figure 1:
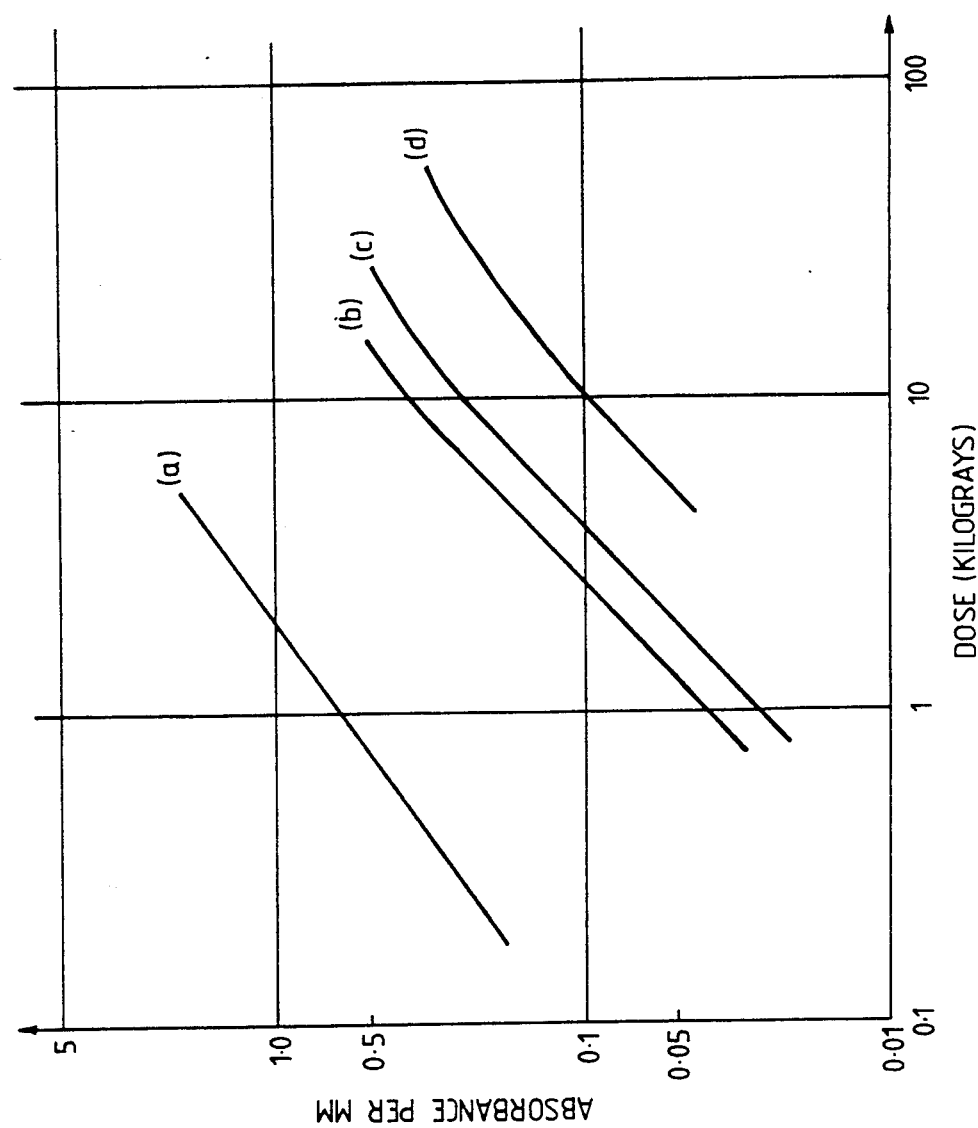
FIG. 1 is a graph showing the relationship between spectrophotometric response at the optimum measuring wavelength (termed absorbance) and radiation dose for material of the invention and comparative material.

An homogeneous mixture consisting of stabiliser-free methyl methacrylate (1 kg), hexachloroethane (10 g), dimethyl yellow (1 g) and azobisdiisobutyronitrile (0.6 g) as a polymerising agent for the methyl methacrylate was prepared. All ingredients were of high purity and were acid-free and no other materials such as U.V. stabilisers were present. (A release agent such as sodium dioctylsulphosuccinate may be present in small amounts if necessary, and the quantity of polymerising agent may be varied to suit the polymerisation conditions.)

The mixture was then polymerised in plate-glass moulds having 1.5 mm to 2 mm separation between plates. (The separation may be greater if thicker material for low-dose applications is required). The moulds were heated to 70° C. to cause polymerisation to take place and then heated to 105° C. for 2 hours to cure the polymer. The moulds were then cooled, taken apart and product material stripped out in the form of sheets.

Polymerisation and curing temperatures may be varied to achieve a required performance of the product material. Generally, performance improves with, for example, curing time though unwanted discolouration may occur if the curing temperature is too high or the curing time too long.

The sheets made as above were cut into rectangular dosimeters (11 mm×30 mm) and calibrated by irradiation of representative samples using accurately known cobalt-60 gamma doses and measuring the radiation-induced specific optical absorbance at a wavelength of 540 nm. A plot of specific absorbance against dose produced a calibration curve which could subsequently be used for converting specific absorbance into a dose value.

Referring to FIG. 1, which has log-log scales, plots are shown, identified by the appropriate small case letter, as follows:

(a) material as produced in Example 1 (540 nm)
(b) Amber 3042A Perspex* (603 nm)
(c) Amber 3042A Perspex* (651 nm)
(d) Red 40304AB Perspex* (640 nm)
(*Perspex is a Registered Trade Mark of ICI plc)

The respective optimum measuring wavelengths are given in parentheses.

Material (a) is material of the invention and materials (b), (c) and (d) are known dosimetry materials, described for example in the aforementioned paper by Dr B. Whittaker. It can be seen from the figure that material (a) is an order of magnitude more sensitive than Amber 3042A Perspex and is capable of allowing dose measurements down to 0.3 kGy or less to be made.

Figure 2:
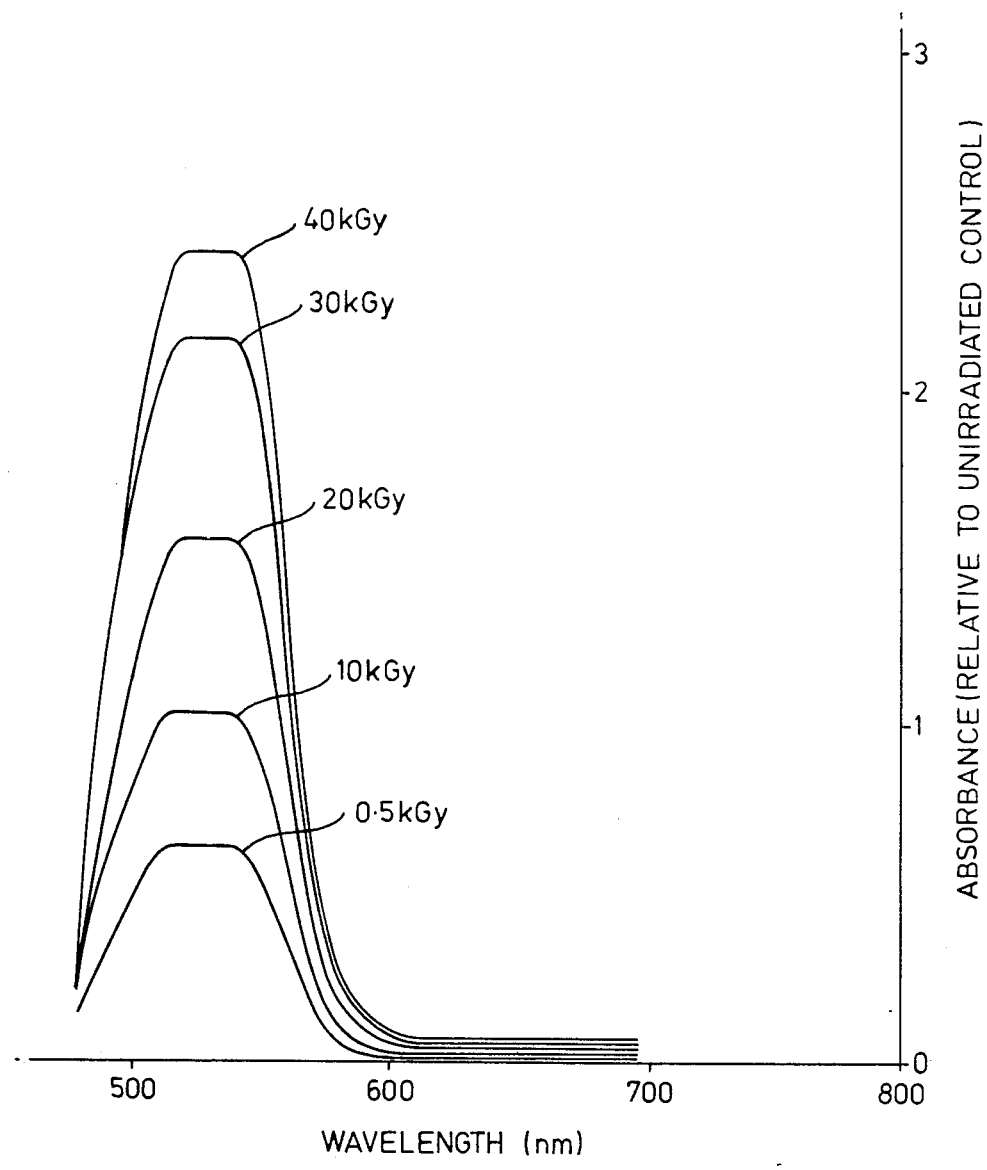
FIG. 2 shows induced absorption spectra for a dosimeter made as described in Example 1 below and of thickness 1.7 mm at different radiation doses.

Referring to FIG. 2, the spectra were obtained by methods known in the art. The absorbance valves are relative to an unirradiated control and are at increasing radiation doses as indicated on the figure. The figure shows how a new absorption band develops as radiation dose is increased.

Figure 3:
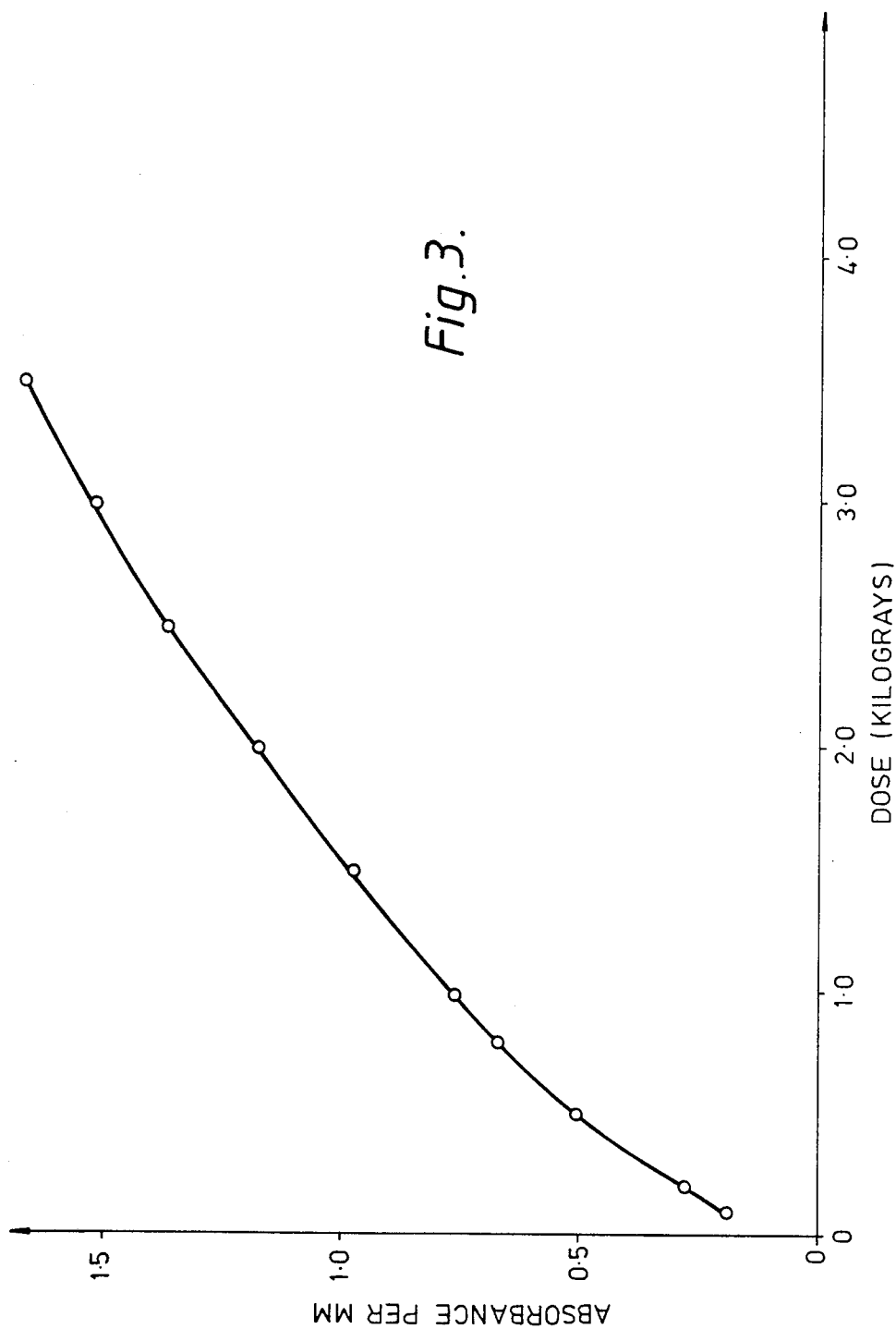
FIG. 3 is a graph showing the relationship between specific absorbance and radiation dose for material made as described in Example 1 below.

Referring to FIG. 3, the valves given were obtained against air as a reference using a Pye Unicam 8800 spectrophotometer at a wavelength of 530 nm and irradiations are carried out on a Co-60 calibration cell at a dose rate of 4.32 KGy h$^{-1}$. The figure can be used for converting specific absorbance into a dose value and further illustrates the usefulness of the material of the invention.

EXAMPLE 2

A mixture of poly(methyl methacrylate) moulding powder (100 g; Daikon MG ex ICI), hexachloroethane (1 g) and dimethyl yellow (0.1 g) was moistened with industrial alcohol to assist dispersion of the dye and then ball milled for one hour. The mixture was then dried in an oven at about 30° C. to remove alcohol and hot-pressed or injection moulded at 140° C.–160° C. The resulting material, when in the form of sheets of 1 mm thickness, was found to exhibit significant colour changes (yellow through orange to red) at doses in excess of 500 Gy.

I claim:

1. A dosimeter for measuring absorber radiation dose in the form of an optically-clear, solid, self-supporting radiation-sensitive plastics material comprising, in homogeneous admixture, a matrix base of a solid polymer selected form poly(methyl methacrylate), polystyrene and polycarbonate, an acid-sensitive dye and a solid halogen-containing substance in which the polymer is insoluble, the material being capable producing a halo-acid is upon radiolysis, said dosimeter having sensitivity to a radiation dose as low as 300 gray.

2. A dosimeter according to claim 1 wherein the polymer is poly(methyl methacrylate).

3. A dosimeter according to claim 1 wherein the halogen-containing substance is an halogenated aliphatic hydrocarbon.

4. A dosimeter according to claim 3 wherein the halogenated aliphatic hydrocarbon is a chloroalkane.

5. A dosimeter according to claim 4 wherein the choroalkane is hexachloroethane.

6. A mehod of making a dosimeter for measuring absorbed radiation dose in the form of an optically-clear, solid, self-supporting radiation-sensitive plastics material comprising the steps of (i) preparing an homogeneous mixture of an acid-sensitive dye, a halogen-containing substance and either a solid polymer selected from poly(methyl methacrylate), polystyrene and polycarbonate or a monomer polymerisable thereto, the polymer being insoluble in the halogen-containing substance; and (ii) polymerising the monomer, if present, and fabricating the mixture into a self-supporting material where the polymer constitutes a matrix, the halogen-containing substance and the polymer being jointly capable of giving rise to a halo-acid upon radiolysis of the material, said dosimeter having sensitivity to a radiation dose as low as 300 gray.

7. A method according to claim 6 wherein a monomer is present in step (i) and is methyl methacrylate.

* * * * *